United States Patent [19]

Kusumgar et al.

[11] Patent Number: 4,795,477
[45] Date of Patent: Jan. 3, 1989

[54] PRINTABLE POLYACETAL COMPOSITIONS

[75] Inventors: Rajal Kusumgar, Livingston; K. M. Natarajan, N. Brunswick; Carl A. Amond, Berkeley Heights, all of N.J.

[73] Assignee: Celanese Corporation, Bridgewater, N.J.

[21] Appl. No.: 886,275

[22] Filed: Jul. 16, 1986

[51] Int. Cl.$^4$ .................................................. D06P 1/16
[52] U.S. Cl. ........................................... 8/471; 8/467; 427/256
[58] Field of Search ........................... 8/467, 471, 506; 525/154; 428/207, 156, 914; 427/256

[56] References Cited

U.S. PATENT DOCUMENTS

| | | | |
|---|---|---|---|
| 3,476,832 | 11/1969 | Pritchard | 525/154 |
| 3,536,673 | 10/1970 | Parrini | 264/78 |
| 4,277,577 | 7/1981 | Burg et al. | 525/154 |
| 4,406,662 | 9/1983 | Beran et al. | 8/471 |
| 4,465,728 | 8/1984 | Haigh | 428/156 |
| 4,587,155 | 5/1986 | Durand | 8/467 |

OTHER PUBLICATIONS

"Hot Stamping Shows A World of Versatility", by George Smoluk, *Modern Plastics*, Dec. 1985, pp. 52–55.

*Primary Examiner*—Paul Lieberman
*Assistant Examiner*—John F. McNally
*Attorney, Agent, or Firm*—Depaoli & O'Brien

[57] ABSTRACT

The printability of oxymethylene polymers such as by the heat transfer of sublimable dyes is improved by the addition of an amorphous or partially crystalline polymer to the oxymethylene polymer molding composition.

19 Claims, No Drawings

PRINTABLE POLYACETAL COMPOSITIONS

BACKGROUND OF THE INVENTION

The present invention relates to a process of heat transfer printing the surface of shaped articles of polyacetals with sublimable dyes.

Heat transfer printing is a process for transferring sublimable disperse dyes to a receiving substrate by sublimation of the dye from a printed intermediate or auxiliary carrier and diffusion of the gaseous dye into the surface of the receiving substrate. The intermediate carrier may be of any of several appropriate materials including paper, metal, such as aluminum or steel, plastic, or fabrics optionally coated with various resins such as vinyl, polyurethane, polytetrafluoroethylene, or the like. All paper printing techniques, including gravure, lithography, rotary screen, and flexography, with their respective advantages and limitations have been used to print the carrier with the ink containing the sublimable disperse dyes. The dye is transferred by pressing the printed surface of the intermediate carrier into intimate contact with the substrate surface to be printed and applying sufficient heat and pressure to sublime the dye and cause diffusion of the dye into the substrate. Upon cooling, the dye condenses and is permanently adhered to the substrate.

It is commercial practice to print textile materials by sublimation printing from carriers printed or coated with disperse dyes in the form or an ink or paste. In the heat transfer printing of textiles, a wide variety of receiving substrates have been used including such synthetic polymers as polyacrylonitrile, polymers of vinyl compounds such as acrylic esters, acrylic amides, vinyl pyridine, vinyl chloride, vinylidene chloride, etc.; copolymers of dicyanoethylene and vinyl acetate; polyurethane; polyolefins; cellulose acetates; polyamides; and aromatic polyesters such as those from terephthalic acid and ethylene glycol or 1,4-di(hydroxymethyl)cyclohexane.

With the wide spread use of plastic articles in business and in the home, there is an obvious need for suitably decorating these articles. Such articles include tables, counter-tops, wall paneling, furniture, and the like. One particular important commercial application in business has been the sublimation printing or marking of business-machine keyboards. The sublimation dying or printing of plastic materials, however, has not been as readily accomplished as the heat transfer printing of textile materials. Among the problems which have been found is that the plastics do not readily absorb the dye, the heat required to sublime the dyes also is sufficient to soften the plastic receptor surface, as well as the dye adhesives on the transfer paper, and the paper and plastic fuse together.

U.S. Pat. No. 4,465,728 discloses a heat transfer process which attempts to alleviate some of these problems for heat transfer printing thermoplastics which will absorb sublimable dyes including polycarbonates, vinyls, acrylics, polystyrene, ABS (acrylonitrile-butadiene-styrene) and like extrudable polymers.

U.S. Pat. No. 4,406,662 discloses a process for improving the heat transfer printing of articles molded from filled methyl methacrylate homopolymers and copolymers of methyl methacrylate with other ethylenically unsaturated compounds (e.g., vinyl acetate, styrene, alkylacrylates, acrylonitrile, alkylmethacrylates, multifunctional acrylic monomers such as alkylene dimethacrylates and alkylene diacrylates) by preheating the articles.

While not directed specifically to heat transfer printing, U.S. Pat. No. 3,536,673 is directed to improving the dyeing of synthetic textiles, more particularly polyolefin textile fibers with disperse or metallized dye stuffs. In this particular patent, polyolefin textile fibers, in particular, polypropylene fibers are modified to enhance the dye-receptivity thereof by mixing the polyolefin with 5-25% by weight of polyoxymethylene.

Commercially, only a few thermoplastic resins have been printed by the heat transfer technique. These are polybutylene terephthalate such as marketed under the tradename Celanex from Celanese Corporatio as well as polycarbonate and polybutylene terephthalate and polycarbonate blends. A discussion of hot stamping plastic materials is given in "Hot Stamping Shows a World of Versatility", George Smoluk, *Modern Plastics*, December 1985, page 52.

One particular engineering thermoplastic which has not previously been printed satisfactorily by the heat transfer process is polyacetal or oxymethylene polymer resin. Oxymethylene polymers, having recurring —CH$_2$O— units have been known for many years. They may be prepared by the polymerization of anhydrous formaldehyde or by the polymerization of trioxane which is a cyclic trimer of formaldehyde. The oxymethylene polymers are highly crystalline in nature and thus when molded or otherwise shaped into articles do not allow sufficiently deep penetration of the printing inks. Consequently, oxymethylene polymers have not been acceptable materials as substrates for the sublimation printing process.

It is widely known to modify the properties of oxymethylene polymers by incorporating additives therein. Thus, use of various additives have been suggested for improving the mechanical and physical properties such as the impact strength of oxymethylene polymers. The following patents are illustrative of such art.

U.S. Pat. No. 3,281,499 discloees improving the thermal stability and melting range of polyacetal polymers by reacting a polyacetal prepolymer having polymeric chains consisting essentially of a major proportion of recurring oxymethylene units and a monoethylenically unsaturated compound in the presence of a free radical yielding compound.

U.S. Pat. No. 3,476,832 discloses an oxymethylene polymer composition with improved impact resistance and superior flex resistance comprising a blend of a solid oxymethylene polymer and a rubbery polymeric material such as derived from diolefin-nitrile copolymers, lower alkyl acrylate homopolymers, and copolymers of lower alkyl acrylates with butadiene, ethylene, vinylethers, acrylonitrile, and the like.

U.S. Pat. No. 3,526,680 discloses improving the impact strength of oxymethylene polymers by blending therewith a copolymer of alpha-olefins and unsaturated carboxylic acids, which copolymer contains ions of mono to trivalent metals. Thus, copolymers of ethylene and acrylic acid or methacrylic acid which contain alkali metal ions can be used.

U.S. Pat. No. 3,704,275 modifies the properties of polyoxymethylenes by incorporating therein an inorganic nucleating agent and a polymer which is dispersed in the molding composition in the form of particles having a diameter in the range of from 0.1 to 5 microns. Various modifying polymers are disclosed including numerous olefinically unsaturated compounds including alpha-olefins such as polyethylene and ethylene/acrylic acid copolymers among numerous others.

U.S. Pat. No. 3,850,873 discloses glass fiber-reinforced polyoxymethylenes exhibiting improved mechanical properties by blending therewith a high molecular weight polyurethane. Polyurethane-modified oxymethylene polymer compositions are known to increase the impact strength relative to oxymethylene compositions without the polyurethane addition.

U.S. Pat. No. 4,201,849 discloses acetal resin compositions which exhibit very small mold shrinkage and mold warping by blending the acetal resin with a petroleum resin which has been prepared by polymerizing a cracked petroleum fraction boiling between $-15°$ and 200° C. and containing unsaturated hydrocarbons.

U.S. Pat. No. 4,277,577 discloses an oxymethylene polymer molding composition of improved impact strength comprising a blend of an oxymethylene polymer, an elastomer, and a segmented thermoplastic copolyester or a polyurethane.

U.S. Pat. No. 4,424,307 discloses an oxymethylene polymer which is modified with 1,2-polybutadiene to enhance the physical properties, including tensile impact, elongation and work to break of the oxymethylene polymer.

Accordingly, while it has been suggested to modify oxymethylene polymers by adding thereto various polymeric materials, up until the present time, it has not been recognized that polymer additions to oxymethylene polymers can yield thermoplastic molding compositions which can be satisfactorily printed by the heat transfer printing process from otherwise substantially unprintable highly crystalline oxymethylene polymer.

Inasmuch as oxymethylene polymers have desirable physical and mechanical properties including good impact strength it would be advantageous to print molded articles formed therefrom and increase the use of this plastic in the home and in the business environment. Accordingly, a principle object of the present invention is to improve the printability of oxymethylene polymers by the sublimation printing process. Another object of the invention is to extend the use of polyacetal resins in various home and business environments where decorated engineering plastics have found use.

These and other objects, as well as the scope, nature, and utilization of the present invention, will be apparent to those skilled in the art from the following description and appended claims.

SUMMARY OF THE INVENTION

In accordance with the present invention, there is provided an oxymethylene polymer molding composition which is capable of being molded to form articles exhibiting enhanced ability to be printed by the sublimation printing process. The molding composition of this invention comprises an intimate blend of about 50 to about 95 wt. % based upon the total weight of the composition of an oxymethylene polymer and from about 5 to about 50 wt. % based upon the total weight of the composition of an amorphous or partially crystalline polymer.

Thus, in accordance with the present invention there is provided a process for the sublimation printing of molded articles formed from an oxymethylene polymer molding composition comprising a blend of about 50 to about 95 wt. % of an oxymethylene polymer and from about 5 to about 50 wt. % of an amorphous or partially crystalline polymer. The addition of the amorphous or partially crystalline polymer to the oxymethylene polymer improves the penetration of various color inks into molded articles formed from the composition compared to molded articles formed from a wholly oxymethylene polymer. Moreover, the modified oxymethylene polymer compositions of this invention can be heat transfer printed to yield brighter and sharper printed surfaces compared to unmodified oxymethylene polymers. The compositions are easily moldable and extrudable into articles and maintain the desired physical and mechanical properties of unmodified oxymethylene polymers. Thus, while the compositions of the present invention are not novel as compositions, per se, the modified oxymethylene polymer compositions of this invention have unexpectedly improved ability to be printed by the sublimation printing process and thus extend the use of polyacetal resins in various home and business environments where decorated engineering plastics have found use.

DESCRIPTION OF PREFERRED EMBODIMENTS

The oxymethylene polymer used in the printable molding composition of the present invention is well known in the art. The polymers are characterized as having recurring oxymethylene groups or units, i.e., $-CH_2O-$. The term oxymethylene polymer as used herein is intended to include any oxymethylene polymer having $-CH_2O-$ groups comprising at least about 50 percent of the recurring units, for example, homopolymer, copolymers, terpolymers and the like.

Typically, the homopolymers are prepared by the polymerization of anhydrous formaldehyde or by the polymerization of trioxane which is a cyclic trimer of formaldehyde. For example, high molecular weight polyoxymethylenes have been prepared by polymerizing trioxane in the presence of certain fluoride catalysts such as antimony fluoride and may also be prepared in high yields and at rapid reaction rates by the use of catalysts comprising boron fluoride coordinate complexes with organic compounds, as described in application Ser. No. 691,143, filed Oct. 21, 1957, by Hudgin and Berardinelli.

The homopolymers are usually stabilized against thermal degradation by end-capping or the incorporation therein of stabilizer compounds such as described in U.S. Pat. No. 3,133,896 to Dolce and Berardinelli.

Oxymethylene polymers that are particularly adapted for use in the molding compositions of the present invention are oxymethylene copolymers, which may be prepared as described in U.S. Pat. No. 3,027,352 of Walling et al by copolymerizing, for example, trioxane with any of various cyclic ethers having at least two adjacent carbon atoms, e.g., ethylene oxide, dioxolane, and the like.

Especially suitable oxymethylene copolymers which may be used in the molding compositions of the present invention usually possess a relatively high level of polymer crystallinity, i.e., about 70 to 80 percent. These preferred oxymethylene copolymers have repeating units which consist essentially of (a) $-OCH_2-$ groups interspersed with (b) groups represented by the general formula:

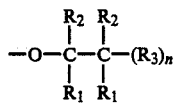

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive.

Each lower alkyl radical preferably has from one to two carbon atoms, inclusive. The —OCH$_2$— units of (a) constitute from about 85 to about 99.9 percent of the recurring units. The units of (b) may be incorporated into the copolymer during the step of copolymerization to produce the copolymer by the opening of the ring of a cyclic ether having adjacent carbon atoms, i.e., by the breaking of an oxygen-to-carbon linkage.

Copolymers of the desired structure may be prepared by polymerizing trioxane together with from about 0.1 to about 15 mole percent of a cyclic ether having at least two adjacent carbon atoms, preferably in the presence of a catalyst such as a Lewis acid (e.g, $BF_3$, $PF_5$, and the like) or other acids (e.g., $HClO_4$, 1% $H_2SO_4$, and the like).

In general, the cyclic ethers employed in making the preferred oxymethylene copolymers are those represented by the general formula:

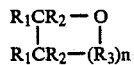

wherein each $R_1$ and $R_2$ is selected from the group consisting of hydrogen, lower alkyl and halogen-substituted lower alkyl radicals, and each $R_3$ is selected from the group consisting of methylene, oxymethylene, lower alkyl and haloalkyl-substituted methylene, and lower alkyl and haloalkyl-substituted oxymethylene radicals, and n is an integer from zero to three inclusive. Each lower alkyl radical preferably has from one to two carbon atoms, inclusive.

The preferred cyclic ethers used in the preparation of the preferred oxymethylene copolymers are ethylene oxide and 1,3-dioxolane, which may be represented by the formula:

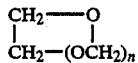

wherein n represents an integer from zero to two, inclusive. Other cyclic ethers that may be employed are 1,3-dioxane, trimethylene oxide, 1,2-propylene oxide, 1,2-butylene oxide, 1,3-butylene oxide and 2,2-di-(chloromethyl)-1,3-propylene oxide.

The preferred catalyst used in preparing the desired oxymethylene copolymers is the aforementioned boron trifluoride as discussed in the previously identified Walling et al patent. Reference is made to this patent for further information concerning the polymerization conditions, amount of catalyst employed, and the like.

The oxymethylene copolymers produced from the preferred cyclic ethers have a structure composed substantially of oxymethylene and oxyethylene groups in a ratio of from about 6 to 1 to about 1000 to 1.

The oxymethylene copolymers that are preferably present in the molding compositions of the present invention are thermoplastic materials having a melting point of at least 150° C., and normally are millable or processable at a temperature of from about 180° C. to about 200° C. They have a number average molecular weight of at least 10,000. The preferred oxymethylene copolymers have an inherent viscosity of at least 1.0 (measured at 60° C. in a 0.1 weight percent solution in p-chlorophenol containing 2 weight percent of alphapinene).

The oxymethylene copolymer component of the molding composition of this invention preferably is an oxymethylene copolymer that has been preliminarily stabilized to a substantial degree. Such stabilizing technique may take the form of stabilization by degradation of the molecular ends of the polymer chain to a point where a relatively stable carbon-to-carbon linkage exists at each end. For example, such degradation may be effected by hydrolysis as disclosed in U.S. Pat. No. 3,219,623 to Berardinelli.

If desired, the oxymethylene copolymer may be end-capped by techniques known to those skilled in the art. A preferred end-capping technique is accomplished by acetylation with acetic anhydride in the presence of sodium acetate catalyst. A preferred oxymethylene copolymer is commercially available from Celanese Corporation under the designation CELCON ® acetal copolymer, and especially preferred is CELCON ® M90 which has a melt index of about 9.0 g/10 min. when tested in accordance with ASTM D1238-82.

With respect to the oxymethylene terpolymer, it may be prepared, for example, by reacting trioxane and a cyclic ether and/or cyclic acetal such as in the preparation of the oxymethylene copolymer, with a third monomer which is a bifunctional compound such as a diglycide of the formula:

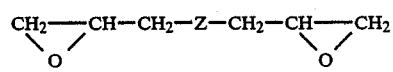

wherein Z represents a carbon-to-carbon bond, an oxygen atom, an oxy-alkoxy of 1 to 8 carbon atoms, preferably 2 to 4 carbon atoms, and which may be an oxycycloalkoxy of 4 to 8 carbon atoms, or an oxy-poly(lower alkoxy), preferably of 2 to 4 recurring groups each with 1 to 2 carbon atoms, for example, ethylene diglycide, diglycidyl ether and diethers of 2 mols of glycide and 1 mol of formaldehyde, dioxane or trioxane, or diethers of 2 mols of glycide and 1 mol of an aliphatic diol with 2 to 8 carbon atoms, advantageously 2 to 4 carbon atoms, or a cycloaliphatic diol with 4 to 8 carbon atoms.

Examples of suitable bifunctional compounds include the diglycidyl ethers of ethylene glycol, 1,4-butanediol, 1,3-butanediol, cyclobutane-1,3-diol, 1,2-propane-diol, cyclohexane-1, 4-diol and 2-dimethyl-4-dimethyl-cyclobutane1,3-diol, with butanediol diglycidyl ethers being most preferred.

Generally, in preparing the terpolymer of trioxane, cyclic ether and/or cyclic acetal and at least one bifunctional diglycide compound, a ratio of from 99.89 to 89.0 weight percent trioxane, 0.1 to 10 weight percent of the cyclic ether and/or cyclic acetal, and 0.01 to 1 weight percent of the bifunctional compound is preferred, with the percentage figures being based on the total weight of monomers used in forming the terpolymer. The terpolymers thus obtained are characterized as being essentially white and having a particularly good extrudability.

The polymerization of the terpolymer may be carried out according to known methods, that is in substance, solution or suspension, while using the above-mentioned quantitative proportions of the termonomers. As solvents, there may advantageously be used inert aliphatic or aromatic hydrocarbons, halogenated hydrocarbons or ethers.

In some cases, it may be advantageous to use the following quantitative proportions: 99.85 to 89.5 weight percent of trioxane, 0.1 to 10 weight percent of cyclic ether or cyclic acetal, and 0.05 to 0.5 weight percent of diglycidyl ether, the percentage figures being calculated on the total weight of the monomer mixture used for preparing the terpolymer.

The trioxane-based terpolymer polymerization is advantageously carried out at temperatures at which trioxane does not crystallize out, that is, at a temperature within the range of $-50°$ C. to $+100°$ C., dependigg on the solvent used, and in the absence of a solvent at a temperature within the range of $+20°$ C. to $+100°$ C.

As trioxane-based terpolymer polymerization catalyst, all substances may be used which are capable of initiating a cationic polymerization, for example, organic or inorganic acids, acid halides and, preferably, Lewis acids. Of the latter, boron fluoride and its complex compounds, for example, etherates of boron fluoride, are advantageously used. Diazonium fluoroborates are particularly advantageous.

The concentration of the catalyst may vary within the limits depending on the nature of the catalyst and on the intended molecular weight of the terpolymer. The concentration of the catalyst may be within the range of 0.0001 to 1 weight percent, calculated on the total monomer mixture, and is advantageously within the range of 0.001 to 0.1 weight percent.

Since the catalysts tend to decompose the terpolymer, the catalyst is advantageously neutralized immediately after the polymerization, for example, with ammonia or methanolic or acetonic amine solutions.

The unstable terminal hemiacetal groups may be removed from the terpolymer in the same manner as known for other oxymethylene polymers. Advantageously, the terpolymer is suspended in aqueous ammonia at temperature within the range of 100° to 200° C., and if desired, in the presence of a swelling agent such as methanol or n-propanol. Alternatively, the terpolymer is dissolved in an alkaline medium at temperatures above 100° C. and subsequently reprecipitated. Examples of suitable solvents are benzyl alcohol, ethylene glycol monoethyl ether or a mixture of 60 weihht percent methanol and 40 weight percent water. Examples of suitable compounds having an alkaline reaction are ammonia and aliphatic amines.

It is also possible to thermally stabilize the terminal groups of the terpolymers in the absence of a solvent in the melt in the presence of a stabilizer.

Alternatively, the terpolymer can be subjected to heterogeneous hydrolysis wherein water, with or without a catalyst, e.g., an aliphatic or aromatic amine, is added to a melt of the terpolymer in an amount ranging from about 1 to about 50 percent based on the weight of the terpolymer. The terpolymer mixture is maintained at a temperature in the range of from about 170° to 250° C. for a specified period of time, and then washed with water and dried or centrifuged.

A preferred oxymethylene terpolymer is commercially available from Celanese Corporation under the designation U10, and is a butanediol diglycidyl ether-/ethylene oxide/trioxane terpolymer containing about 0.05 weight percent, 20. weight percent, and 97.95 weight percent of each component, respectively.

It is within the ambit of the present invention to use oxymethylene polymers that include, if desired, plasticizers, formaldehyde scavengers, mold lubricants, antioxidants, fillers, colorants, reinforcing agents, light stabilizers, pigments, other stabilizers, and the like, so long as such additives do not materially affect the desired properties including enhancement of printability of the resulting molding composition and the articles molded therefrom.

Suitable formaldehyde scavengers include cyanoguanidine, melamines, polyamides, amine-substituted triazines, amidines, ureas, hydroxyl salts of calcium, magnesium, and the like, salts of carboxylic acids, and metal oxides and hydroxides. Cyanoguanidine is the preferred formaldehyde scavenger. Suitable mold lubricants include alkylene bisstearamide, long-chain amides, waxes, oils, and polyether glycides. The preferred mold lubricant is commercially available from Glyco Chemical, Inc. under the designation Acrawax C and is alkylene bisstearamide. The preferred antioxidants are hindered bisphenols. Especially preferred is 1,6-hexamethylene bis-(3,5-di-t-butyl-4-hydroxyhydrocinnamate), commercially available from Ciba-Geigy Corp. under the designation Irganox 259.

The oxymethylene polymer as described hereinabove is modified to improve the printability of articles molded therefrom by incorporating amorphous or partially crystalline polymers. By the term partially crystalline, it is meant that the polymer have a crystallinity which does not exceed 30%.

Although, as will be seen, the amorphous or partially crystalline polymer can be either normally solid or normally rubbery, the compositions of this invention are all normally rigid. Therefore, if the additive polymer is rubbery, the maximum amount used is that which ensures that the final composition will be rigid at ordinary temperatures, e.g., about 75°–90° F.

The following examples of useful additive polymers may be cited:

(1) Homo- and copolymers of alpha-olefins, for example polyethylene, ethylene/propylene copolymers, ethylene/acrylic ester copolymers, ethylene/methacrylic ester copolymers, ethylene/acrylic acid copolymers. Especially suitable are polyethylene or copolymers of ethylene with vinyl acetate, or copolymers of ethylene with acrylic esters, preferably the methylacrylic, ethylacrylic, butylacrylic or 2-ethylhexylacrylic ester, where the amount of ethylene is from 40 to 90, preferably 50 to 80 weight %.

(2) Homo- and copolymers of 1,3-dienes having 4 to 5 carbon atoms, for example polybutadiene, polyisoprene, butadiene/styrene copolymers, butadiene/acrylonitrile copolymers, EPDM rubbers.

(3) Homo- and copolymers of vinyl esters, for example polyvinyl acetate, polyvinyl propionate, polyvinyl butyrate.

(4) Homo- and copolymers of acrylic and methacrylic esters, for example polyethylacrylate, polybutylacrylate, poly-2-ethylhexylmethacrylate, polyoctylmethacrylate.

(5) Polyurethanes, for example polyester and polyether types.

(6) Polyphenylene ethers, such as poly(2,6-dimethyl-1,4-phenylene)ether.

(7) Polysulfones, such as the condensation product of bisphenol-A and 4,4'-dichlorodiphenyl sulfone.

(8) Polyamides, such as polycaprolactam, or the product of hexamethylenediamine and adipic acid.

(9) Polyimides, e.g., the product of bismaleimido diphenyl methane and methylene dianiline.

(10) Normally solid or normally rubbery polyorganosiloxanes, such as polyalkyl or aryl-siloxanes, or combinations of the two, and copolymers of polyorganosiloxanes with vinyl aromatics, e.g. styrene; acrylic monomers, e.g., methyl methacrylate; or aromatic esters, e.g., the reaction products of bisphenol-A and iso or terephthaloyl chloride; as well as siloxane-nitrogen copolymers containing amido, amide-imido and imide groups.

All such polymers are either commercially available or can be made in ways known to those skilled in the art.

A particularly preferred amorphous polymer for modifying the printability oxymethylene polymer is an elastic polyurethane. Useful elastomeric polyurethane are those which have been prepared from polyester polyols, polyether polyols such as polyethylene-glycol ethers, polypropyleneglycol ethers or polyacetals having free hydroxyl end groups and polyisocyanates, in particular diisocyanates, using chain-extending agents such as low molecular weight polyols, preferably glycols.

The polymeric polyols and polyol extenders which can be used are those conventionally employed in the art for the preparation of such elastomers. The polymeric polyols are preferably polymeric diols which advantageously have molecular weights in the range of 400 to 4000 and preferably within the range of about 500 to about 3000. Illustrative of polymeric diols are polyester diols and polyether diols and mixtures thereof having molecular weights within the above range. The polyester diols include the essentially linear polymeric diols which are obtained by esterification of an aliphatic or aromatic dibasic acid or anhydride with a glycol. Preferably the glycol is employed in excess of the stoichiometric proportion with respect to the acid or anhydride in order to ensure that the polyesters are hydroxyl-terminated. Representative dicarboxylic acids (or their anhydrides) employed in the preparation of the polyester diols are adipic, succinic, pimelic, suberic, azelaic, sebacic, terephthalic, phthalic, and the like acids or their anhydrides or mixtures of two or more of said acids or anhydrides. Adipic acid is the preferred acid. Representative glycols employed in the preparation of the polyester diols are the straight chain aliphatic glycols containing from 2 to 10 carbon atoms, inclusive, such as ethylene glycol, propane-1,3-diol, butane-1,4-diol, 2-butene-1,4-diol, hexane-1,6-diol, octane-1,8-diol, decane-1,10-diol, and the like, or mixtures of two or more such glycols.

In addition to the above type of polyester diols, there can also be used the polycaprolactone diols which are prepared by polymerizing the appropriate caprolactone with the appropriate difunctional initiator, such as an aliphatic glycol as exemplified above or an alkanolamine such as ethanolamine, propanolamine, butanolamine, and the like. Such procedures and products are well-known in the art; see, for example, U.S. Pat. No. 2,914,556. A particularly preferred polyester diol is that obtained by initiating the polymerization of ε-caprolactone with 1,4-butanediol.

The polyether polyols employed in the preparation of the polyurethane elastomers of the invention include the polyether glycols having molecular weights in the above defined range and prepared by reacting ethylene oxide, propylene oxide, butylene oxide, or mixtures thereof with water or with diols such as ethylene glycol, 1,2-propylene glycol, 1,3-propanediol 1,4-butanediol, 2,3-butanediol, 1,5-pentanediol, 1,2-hexanediol, diethanolamine, resorcinol, catechol, bis(p-hydroxyphenyl) methane, diethylene glycol, dipropylene glycol, and the like.

The extenders which are employed in preparing the polyurethane elastomers of the invention can be any of the diol extenders commonly employed in the art. Illustrative of diol extenders are aliphatic diols, advantageously containing from 2 to 6 carbon atoms, inclusive, such as ethylene glycol, 1,3-propylene glycol, 1,2-propylene glycol, 1,4-butanediol, 1,2-hexanediol, neopentyl glycol, and the like; and dihydroxyalkylated aromatic compounds such as the bis(2-hydroxyethyl)ethers of hydroquinone and resorcinol; p-xylene-a,a'-diol; the bis(2-hydroxyethyl)ether of p-xylene-a,a'-diol; m-xylene-a,a'-diol and the bis(2-hydroxyethyl)ether thereof.

The organic diisocyanate employed in the process of the invention can be any of those commonly employed in the preparation of polyurethane elastomers. Illustrative of said diisocyanates are 2,4-tolylenediisocyanate, 2,6-tolylene diisocyanate, 4,4'-methylenebis(phenyl isocyanate), 3,3'-dimethyl-4,4'-diisocyanatodiphenyl, 3,3'-dimethoxy-4,4'-diisocyanatodiphenyl, 3,3'-dichloro-4,4'-diisocyanatodiphenyl, β,β'-diisocyanato-1,4-diethylbenzene, 1,5-naphthalene diisocyanate, 1,4-phenylene diisocyanate, and the like, including mixtures of two or more of the above diisocyanates. The preferred diisocyanate is 4,4'-methylenebis(phenyl isocyanate).

The elastomeric polyurethanes which are useful in the present invention can be prepared by processes which are conventional in the art for the synthesis of thermoplastic polyurethanes. Illustrative of such processes are those described in U.S. Pat. Nos. 3,493,364; 4,169,196; 4,202,957; and 3,642,964. Such processes include the one-shot procedure in which all of the reactants are brought together simultaneously, and the prepolymer procedure in which the isocyanate is reacted with the polyester or polyether glycol in a first-step and the isocyanate-terminated prepolymer so produced is subsequently reacted with the diol extender. The one-shot process also includes the process in which the diisocyanate has been converted to a quasiprepolymer by reaction with a minor amount (i.e., less than about 10% on an equivalent basis) of the glycol prior to carrying out the polyurethane-forming reaction.

If desired, the elastomeric polyurethanes or any of amorphous or partially crystalline polymers of the present invention can have incorporated in them, at any appropriate stage of preparation, additives such as pigments, fillers, lubricants, stabilizers, antioxidants, coloring agents, fire retardants, and the like, which are commonly used in conjunction with such polymers.

The printable oxymethylene polymer molding composition of the present invention comprise from about 5 to about 50 weight percent, preferably from about 10 to about 50 weight percent, and most preferably from about 10 to about 40 weight percent of the amorphous or partially crystalline polymeric additive. Correspondingly, from about 50 to about 95 weight percent, preferably from about 50 to about 90 weight percent, and most preferably from about 60 to about 90 weight percent of the oxymethylene polymer is present. The above weight percents are based on the total weight of the molding composition.

The molding compositions may suitably be prepared by any conventional procedure that will result in an intimate blend or mixture of the components. Preferably, dry or melt blending procedures and equipment are used. For example, the amorphous polymer (in the form of pellets, chips, or granules) can be dry mixed with the oxymethylene polymer (in the form of pellets, chips, granules or powder) typically at room temperatures, and the resulting mixture melt blended in any conventional type extrusion equipment, which is heated to a temperature of from about 180° C. to about 230° C., and preferably from about 185° C. to about 205° C.

Preferably, the polymeric additive and oxymethylene polymer are dried (either alone or together) before being subjected to the intimate blending procedure. The drying can be done in desiccated air having a dew point of about −30° C. to −40° C. or lower, at a temperature of from about 70° C. to about 110° C., and preferably above 80° C. The drying can also be accomplished in a vacuum oven, for example, at a temperature above about 90° C. The drying time will depend primarily on the moisture content, drying temperature, and particular equipment employed, but typically is from about 2 to about 6 hours or more. If the drying is conducted for longer period of time, such as overnight, the drying temperature should preferably be about 70° C. to about 85° C. In general, any conventional drying procedure can be used to reduce the moisture content to below about 0.1 weight percent, based on the total weight of the molding composition, preferably below about 0.05 weight percent, and most preferably below about 0.01 weight percent or lower. As is well known to those skilled in the art, water will react with polyurethanes upon processing the polyurethanes at elevated temperatures and, thus, the water content of the composition must be extremely small where polyurethane polymers are used.

The oxymethylene molding composition resulting from the intimate blending procedure is then comminuted mechanically, for example by chopping, pelletizing or grinding, into granules, pellets, chips, flakes or powders, and processed in the thermoplastic state, for example by injection molding or extrusion molding, into shaped articles, for example, bars, rods, plates, sheets, films, ribbons, tubes and the like.

Preferably, the comminuted oxymethylene molding composition is dried (as discussed above) prior to being molded.

In general, molded articles formed from the molding composition of the present invention can be decorated, printed, dyed, etc. by any conventional heat transfer process technique. Typically, such process involves printing an intermediate or carrier sheet with the desired pattern with a sublimable disperse dye and bringing into intimate contact the printed surface of the carrier and the surface of the molded article which is to receive the dye. Sufficient heat and pressure are applied to sublime the dye and cause diffusion of the gaseous dye into the substrate wherein the decorative pattern or the like is permanently adhered. Any of the known dye carriers and sublimable dyes can be used in the process of printing the molded articles formed from the composition of the present invention.

Thus, the dye transfer or carrier sheet can be any of the numerous dye imprinted webs including paper, metal foil, or plastic film, including those numerous papers in use in transferring dyes and dye patterns in the fabric and textile industry.

The dyes can be of various dyes, including disperse dyes, capable of sublimation of 200° F. and up, including those dyes in use on heat transfer papers on dye transfer in the textile industry.

The temperatures necessary to effect dye transfer and absorption in the present invention have been found to be governed by the temperatures required for dye sublimation and the temperatures at which the dye receptor surface energy level rises to become susceptible to dye penetration, which can be at or below the softening temperatures therefore. These temperatures have been found to be above about 250° F. for the compositions of the present invention, with temperatures above 300° F. being preferred. After the dye transfer is completed, the materials are cooled below the plastic softening temperatures, if necessary, and the applied pressure released and the intermediate carrier separated from the printed surface. The applied pressures necessary to effect dye transfer and absorption will generally be above about 25 psi, but, typically will range from about 50 to 3,000 psi, with about 50 to 500 psi being preferred.

The duration of the application of heat and pressure while the printed transfer sheet is an intimate contact with the article to be printed will vary, although, times of between 30 and 50 seconds are typical.

The following examples are given to illustrate the present invention in more detail. It should be noted that the invention is in no way to be construed as being strictly limited to these examples.

EXAMPLE 1

Two disks formed from oxymethylene polymer compositions were printed with color patterns and the depth of dye penetration was measured. The control disk was formed from Celcon ® M90-04 which is a stabilized acetal copolymer having a melt index of about 9.0 g/10 min. marketed by Celanese Corporation. A second disk was molded from the same acetal copolymer containing an additional 20% by weight of an elastomeric polyester-based polyurethane. The compositions were molded into two inch disks. The disks were printed by transferring the color patterns from paper by intimately contacting the paper transfer sheet and the polyacetal disks at a temperature of 350° F., a pressure of 85 psi for a dwell time of 40 seconds. Portions of the disk containing the dye area were cut, embedded in epoxy and polished down to 1 micron with $Al_2O_3$ powder paste. The polished cross sections were examined in an optical microscope with oblique incidental light. Representative micrographs at 100X were taken from red and green dye areas.

Dye penetrations were found to be deeper and more uniform in the sample containing the 20% by wt. polyurethane. The average depth was around 80 microns. Dye penetration was less uniform in the control. Although the dyes were found to penetrate to a depth of 70 microns, the higher concentration region extends to around 40 microns. The measurements of dye penetration in the samples are estimations made from the micrographs. The estimations were made difficult because of the nature of diffuse boundaries between the dyed and undyed areas.

EXAMPLE 2

Eight disks formed from oxymethylene polymer compositions were printed with black letters and the depth of black dye penetration was measured. Three control disks comprising various oxymethylene copolymers without polymeric addition were tested. Control A was the same acetal copolymer utilized in Example 1. Control B is a similar acetal copolymer having a melt index of 9.0 g/10 min. but containing a different stabilizer than Control A. Control C comprises the same acetal copolymer as Control A but also containing 0.5 wt. % of a branched acetal terpolymer. The compositions were molded into disks, printed and the dye penetration measured as in Example 1. Again the measurements are estimations made from the micrographs in which diffuse boundaries between dyed and undyed areas made exact determinations of dye penetrations impractical. Table 1 summarizes the results which were obtained.

As can be seen, the polyacetal molding composition containing the polyethylene ethylacrylate copolymer and the EPDM rubber additives improve the dye penetration relative to Control C. The multiphase interpolymer did not improve dye penetration.

TABLE 1
Depth of dye penetration in Celcon Disks

| Sample I.D. | Description | Penetration Depth of Black Dye |
| --- | --- | --- |
| A | Stabilized acetal copolymer | 90 microns |
| B | Stabilized acetal copolymer | 100 microns |
| C | Stabilized acetal copolymer containing 0.5 wt. % branched acetal terpolymer | 90 microns |
| D | C plus 5 wt. % polyethylene ethylacrylate | 105 microns |
| E | C plus 10 wt. % polyethylene ethylacrylate | 110 microns |
| F | C plus 5 wt. % KM330[1] | 90 microns |
| G | C plus 10 wt. % KM330 | 65 microns |
| H | C plus 5 wt. % EPDM-based rubber[2] | 100 microns |

[1]A multiphase interpolymer comprising an acrylic elastomeric phase and a rigid thermoplastic phase manufactured by Rohm and Haas, Philadelphia, Pa.
[2]Ethylene propylene-diene terpolymer end capped with maleic anhydride.

What is claimed is:

1. A process for transferring a dye from a intermediate transfer surface to an article molded from an oxymethylene polymer, comprising; intimately contacting said intermediate transfer surface with said molded article and applying sufficient heat and pressure to transfer the dye from said transfer surface to said molded article, said molded article being formed from a blend of about 50 to 90 wt. % of an oxymethylene polymer and from about 10 to 50 wt. % of an amorphous or partially crystalline polymer additive.

2. The process of claim 1 wherein the oxymethylene polymer is selected from the group consisting of:
   (i) oxymethylene homopolymer,
   (ii) oxymethylene copolymer comprising about 85 to about 99.9 percent recurring —OCH$_2$— groups interspersed with groups of the formula:

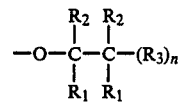

wherein each $R_1$ and $R_2$ is selected from the group consisting of hydrogen, lower alkyl and halogen-substituted lower alkyl radicals, each $R_3$ is selected from the group consisting of methylene, oxymethylene, lower alkyl and halo-alkyl-substituted methylene, and lower alkyl and haloalkyl-substituted oxymethylene radicals and n is an integer from 0 to 3, inclusive, each lower alkyl radical having from 1 to 2 carbon atoms, inclusive, said copolymer having a number average molecular weight of at least 10,000 and a melting point of at least 150° C., and
   (iii) oxymethylene terpolymer, which is the reaction product of trioxane, a cyclic ether and/or cyclic acetal, and a diglycide of the formula:

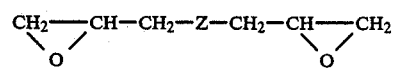

wherein Z is selected from the group consisting of a carbon-to-carbon bond, oxygen, an oxyalkoxy of 1 to 8 carbon atoms, and an oxypoly (lower alkoxy).

3. The process of claim 1 wherein said dye is a dispersed sublimable dye.

4. The process of claim 2 wherein said oxymethylene polymer is said oxymethylene copolymer.

5. The process of claim 4 wherein said oxymethylene copolymer has a melt index of 9.0 g/10 min.

6. The process of claim 1 wherein said polymer additive is an elastomeric polyurethane.

7. The process of claim 6 wherein said molding composition contains 10% by wt. of said elastomeric polyurethane.

8. The process of claim 6 wherein said molding composition contains 20% by wt. of said elastomeric polyurethane.

9. The process of claim 1 wherein said polymer additive is a copolymer of ethylene and alkylacrylate.

10. The process of claim 9 wherein said polymer additive comprises at least about 40 to 90 wt. % ethylene.

11. The process of claim 10 wherein said alkylacrylate is ethylacrylate.

12. The process of claim 10 wherein said alkylacrylate is butylacrylate.

13. The process of claim 1 wherein said polymer additive is a 1,3-diene rubber.

14. The process of claim 13 wherein said rubber is an ethylene-propylene-diene terpolymer end-capped with maleic anhydride.

15. A process for transferring a dye from a intermediate transfer surface to an article molded from an oxymethylene polymer, comprising; intimately contacting said intermediate transfer surface with said molded article and applying sufficient heat and pressure to transfer the dye from said transfer surface to said molded article, said molded article being formed from a blend of a major amount of oxymethylene polymer and at least about a sufficient minor amount of an amorphous or partially crystalline polymer additive to improve dye penetration.

16. The process of claim 15 wherein the oxymethylene polymer is selected from the group consisting of:
(i) oxymethylene homopolymer,
(ii) oxymethylene copolymer comprising about 85 to about 99.9 percent recurring —OCH$_2$— groups interspersed with groups of the formula:

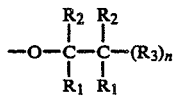

wherein each R$_1$ and R$_2$ is selected from the group consisting of hydrogen, lower alkyl and halogen-substituted lower alkyl radicals, each R$_3$ is selected from the group consisting of methylene, oxymethylene, lower alkyl and halo-alkyl-substituted methylene, and lower alkyl and haloalkyl-substituted oxymethylene radicals and n is an integer from 0 to 3, inclusive, each lower alkyl radical having from 1 to 2 carbon atoms, inclusive, said copolymer having a number average molecular weight of at least 10,000 and a melting point of at least 150° C., and
(iii) oxymethylene terpolymer, which is the reaction product of trioxane, a cyclic ether and/or cyclic acetal, and a diglycide of the formula:

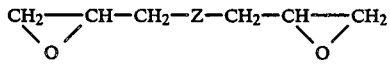

wherein Z is selected from the group consisting of a carbon-to-carbon bond, oxygen, an oxyalkoxy of 1 to 8 carbon atoms, and an oxypoly (lower alkoxy).

17. The process of claim 15 wherein said polymer additive is an elastomeric polyurethane.

18. The process of claim 15 wherein said polymer additive is a copolymer of ethylene and alkylacrylate.

19. The process of claim 15 wherein said polymer is an ethylene-propylene-diene terpolymer end-capped with maleic anhydride.

* * * * *